May 4, 1965 A. WEBER ETAL 3,182,212
PROGRAM-TIMING DEVICE
Filed July 9, 1962 2 Sheets-Sheet 1
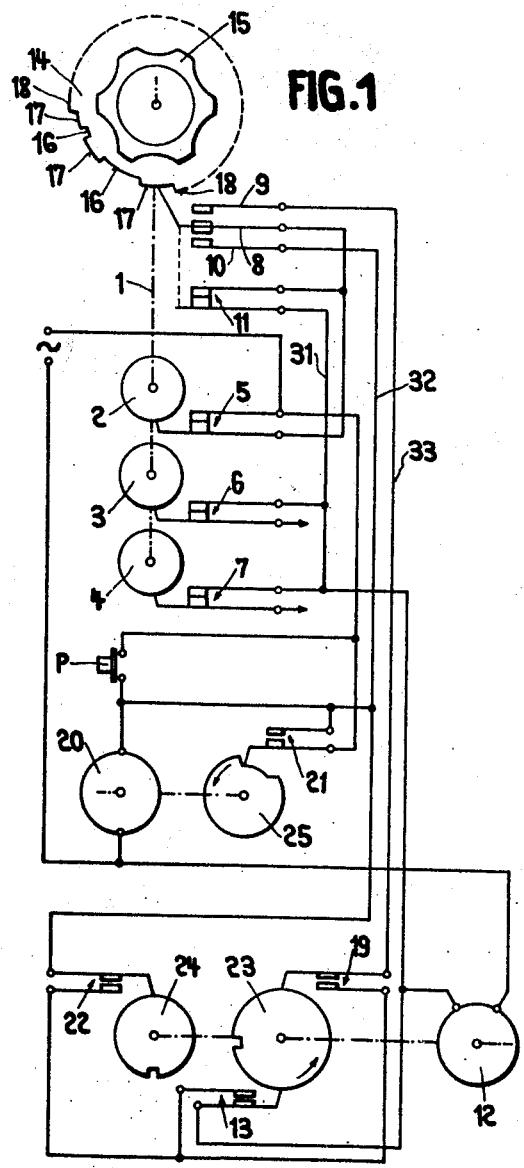
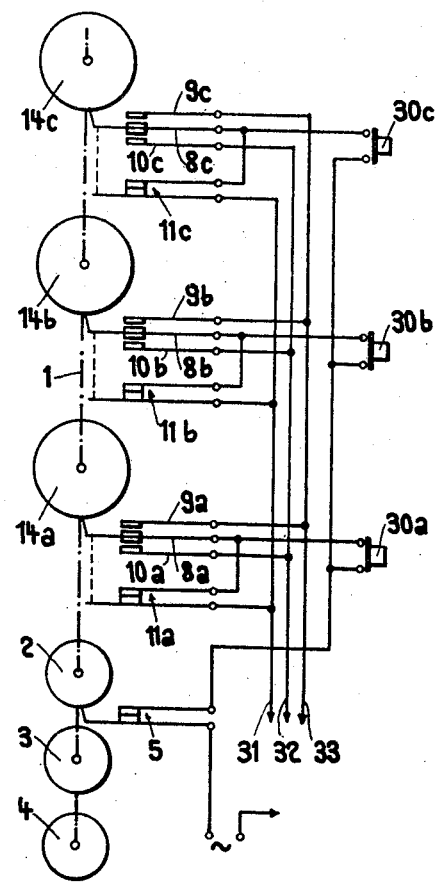
INVENTORS
Artur Weber and André Rufer
BY
*Kurie and Huxley*
ATTORNEYS

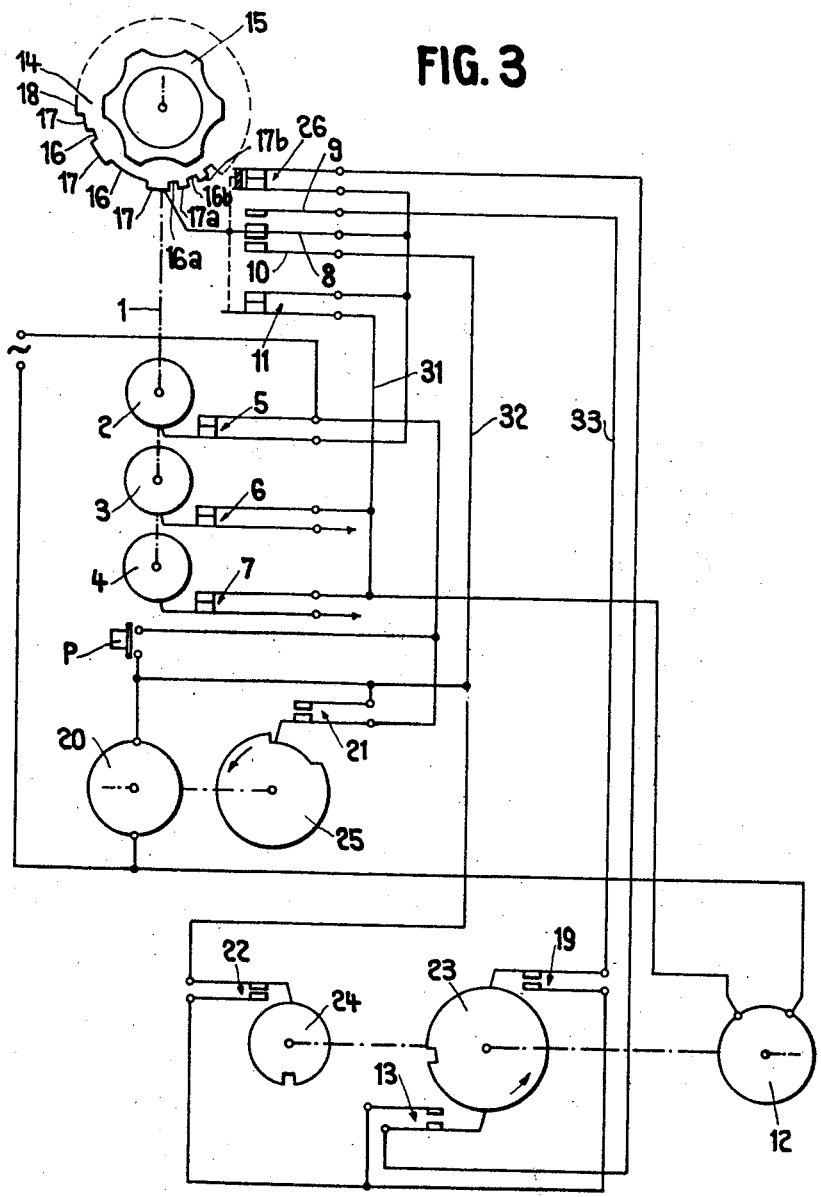

3,182,212
PROGRAM-TIMING DEVICE
Artur Weber, Muri, Bern, and André Rufer, Murten, Switzerland, assignors to Saia A.G., Murten, Switzerland
Filed July 9, 1962, Ser. No. 208,384
Claims priority, application Switzerland, Aug. 11, 1961, 9,431/61
10 Claims. (Cl. 307—141.4)

This invention relates to a program-timing device, and more particularly to a program-timing device for washing machines or the like, allowing simple preselection and control of a number of modified programs. It is known in the art to provide program-timing devices comprising a program-controlling member such as a cam assembly actuating contacts associated therewith, wherein the program-timing member may selectively be advanced at a normal speed or at a high speed for shortening or omitting parts of the program or at a low speed for extending program parts. However, preselection and control of such parts or periods of different speed was relatively complicated in such prior timing devices.

This invention aims in further simplifying the preselection and control of the various speeds of the timing device by providing a program-controlling member actuating control switches, driving means for advancing the said program-controlling member at a normal speed, a standard program being controlled by said program-controlling member when driven at said normal speed, and means for driving said program-controlling means at a high speed substantially exceeding said normal speed for shortening or omitting parts of the standard program, and means for driving said program-controlling means at a low speed for extending parts of said standard program, one single program element, for instance a cam disc, associated with said program-controlling member being provided for each program differing from said standard program, this single program element determining the periods of normal speed, high speed and low speed of said driving means and program-control means respectively. Due to the fact that one single program element is provided for controlling all the speeds throughout the program to which the program element is associated, the speed-controlling means are simple and inexpensive and require little space. Further, preselection of the single program element for controlling the timer speed is extremely simple and may preferably be effected by depression of one selector key associated with the program element to be rendered efficient.

The attached drawing schematically shows, by way of example, three embodiments of the invention.

FIG. 1 is a schematic illustration of the first embodiment, and

FIGS. 2 and 3 are schematic illustrations of two modified embodiments.

The program-timing device shown in FIG. 1 has a cam shaft 1 carrying cam discs 2, 3 and 4 actuating control switches 5, 6 and 7 respectively. The control switch 5 is connected into the power supply line of the device and will deenergize the timer at the end of each program control in a manner explained later on. The control switches 6 and 7 are connected into control circuits of machine parts such as motors, heaters or valves of a washing machine or the like. Of course more than two cams of the type shown at 3 and 4 are usually provided for controlling more machine parts. Switch 5 is series-connected with a change-over switch 8 having outer contacts 9 and 10, and with a switch 11 through which the control switches 6 and 7, a synchronous motor 12 and a pulse generator 13 may be energized. The change-over switch 8 is controlled by a cam disc assembled with an actuating knob 15 and removably mounted on the one end of cam shaft 1. The circumference of the cam disc 14 has control surfaces 16, 17 and 18 at three different levels. The change-over switch 8 is in its intermediate or neutral position shown in the drawing or in touch with the upper contact 9 or in touch with the lower contact 10 according to whether the free end of switch 8 contacts one of the control surfaces 17, one of the control surfaces 16 or one of the control surfaces 18. The upper contact of the change-over switch is series-connected with a pulse switch 19. The lower contact 10 of the change-over switch is connected into the circuit of a motor 20 driving a stepping gear not shown in the drawing and well known in the art for the cam shaft 1. The stepping motor 20 may be energized directly from the mains through switch 21 controlled by a cam disc 25 driven by motor 20. The motor 20 may also be energized through one of pulse switches 13 and 19 and through a switch 22 connected in series with switches 13 and 19.

The program-timing device is shown in its operating condition wherein the switch 5 is closed. The motor 12 is energized through switches 5 and 11 so that the pulse switches 13 and 19 are alternatively operated by the cam disc 23 rotating for instance at a speed of ½ r.p.m. The cam disc 24 is rotated at a speed of four r.p.m. Each of switches 13 and 19 is thus closed at intervals of two minutes while switch 22 is closed four times per minute for a predetermined relatively short time. When the change-over switch 8 is in its intermediate neutral position shown in the drawing, switch 19 is deenergized while switch 13 is energized through switches 5 and 11. Therefore, a pulse will be transmitted to the motor 20 at intervals of two minutes through switches 5, 11, 13 and 22, the duration of this pulse being determined by switch 22 in such a way that the motor 20 will rotate the cam disc 25 coupled therewith to such an extent that switch 21 is closed. In this manner the motor 20 continues to rotate even when the above pulse circuit is now broken at switch 22, until switch 21 is reopened after one full rotation of cam disc 25. A suitable cam not shown in the drawing and well known in the art is coupled with the cam disc 25, this cam acting onto a stepping pawl cooperating with a stepping wheel for advancing the cam shaft 1 by one step during each full rotation of motor 20 and cam disc 25. Therefore, as long as the change-over switch 8 takes its intermediate position, the cam shaft 1 is advanced at low speed by one step at intervals of two minutes. When the change-over switch 8 is thrown to the upper contact 9 the switch 19 is energized and since for an upward displacement of the change-over switch 8 the switch 11 remains in its closed condition, switch 13 is equally energized. It is obvious that through both energized switches 13 and 19 a pulse is transmitted through switch 22 to the motor 20 at intervals of one minute so that the cam shaft 1 is advanced at its normal speed by one step per minute. When the change-over contact 8 is thrown to its lower position, switch 11 is opened so that the motor 12 and the control switches 6 and 7 are deenergized. Further, the motor 20 is continuously energized through contacts 8 and 10 so that the cam shaft 1 is continuously driven at a high speed for instance 2–3 steps per second for omitting predetermined parts of the program. When the cam shaft 1 has been advanced by one full rotation switch 5 is opened by cam disc 2 so that the driving means for the cam shaft and the control switches are deenergized and the timer stops in its end position.

For starting another control cycle the motor 20 is energized for a short period, for instance through a push-button switch P so that the cam shaft 1 is advanced by one step whereby the switch 5 is closed. If it is desired to control another program the program cam disc 14 is replaced by another before starting up the timer.

Instead of selectively mounting one program disc 14 on an end of cam shaft 1, a number of program cam discs 14a–14c may be fixed on the cam shaft 1, as shown in FIG. 2, a set of switches 8a–11a, 8b–11b and 8c–11c respectively being associated with each of these program cam discs. Switch means, for instance a key switch 30a, 30b and 30c respectively is associated to each set of contacts 8–11 for selectively energizing one switch set associated with the program cam disc adapted to control the desired program exactly as set out above for switch set 8–11 of FIG. 1. For a full understanding of the modification shown in FIG. 2 it is sufficient to explain that lines 31, 32 and 33 shown in FIG. 2 correspond to the same conductors in FIG. 1.

Instead of using program cam discs 14 with radially acting cam surfaces at their circumference, program cam discs with axially acting cam surfaces may be used. In this case it is particularly possible to provide more than one cam track or path on one disc, it being possible to associate one single switch controlling the normal, high or low speed of the cam shaft to each of such individual cam tracks or paths of the program cam disc. A similar arrangement of individual control switches for normal, high and low speed of the cam shaft is equally possible or preferable when exchangeable program cards are used instead of program cam discs.

Instead of two pulse switches 13 and 19 any higher number of switches may be provided. As an example, three switches may be disposed at angular distances of 120°, one of such switches being energized for driving the cam shaft 1 at low speed, for instance by one step in three minutes, and all the switches being energized for driving the cam shaft at normal speed of one step in one minute.

In the embodiment shown in FIG. 1 the cam shaft 1 is always advanced when contact 13 is closed. A certain restriction in the choice of programs is thereby implied due to the fact that the slow advance of the cam shaft 1 may start only on an even or only on an uneven minute. Full freedom is only obtained when the low speed of the cam shaft 1 may be controlled selectively by contact 13 or contact 19. This is possible when, as shown in FIG. 3, a switch 26 controlled by switch 8 and opened whenever switch 8 is displaced from its neutral intermediate position shown in the drawing, is connected in series with contact 13. Besides the construction and operation of the embodiments shown in FIGS. 1 and 3 are similar.

When switches 8 and 26 are in the position shown in the drawing, contact 13 is continuously energized and the cam shaft is advanced at low speed as explained above. When the change-over contact 8 is thrown to its upper position switch 26 is opened and contact 13 is de-energized while switch 19 is energized so that the low-speed advance of cam shaft 1 is now controlled by switch 19 at intervals phase-shifted by one minute as compared with the low-speed advance controlled by switch 13. In order to obtain advance at normal speed by one step per minute the change-over switch 8 has to be changed over from its normal to its upper position and vice versa at each step of the cam shaft 1 in order to alternatively energize switches 13 and 19 in such a manner that such switches are energized whenever they are closed by cam disc 23. Assuming that switches 8 and 26 are in the position shown in the drawing, the cam shaft 1 would be advanced by one step when switch 13 which is energized through switch 26 is closed. During this next advance of cam shaft 1 the change-over switch 8 will fall onto cam surface 16a and will be changed over to its upper position thereby energizing contact 19 through contact 9 and deenergizing contact 13 by opening contact 26. During the next advance caused by closure of switch 19 the change-over switch 8 would be returned to its neutral position shown in the drawing by cam surface 17a so that the next advance would again be initiated by switch 13 as explained above. After the next advance of cam shaft 1, switch 8 will again fall onto cam surface 16b and will energize switch 19. Then, switch 8 will again be lifted by cam surface 17b and so on until another speed is controlled in a manner obvious from the drawing and the description of FIG. 1.

What we claim is:

1. A program-timing device, comprising a program-controlling means actuating control switches, driving means for advancing the said program-controlling means at a normal speed, a standard program being controlled by said program-controlling member when driven at said normal speed, means for driving said program-controlling means at a high speed substantially exceeding said normal speed for shortening and omitting parts of the standard program, and means for driving said program-controlling means at a low speed for extending parts of said standard program, said program-controlling means being provided with a single program element for determining all periods of normal speed, high speed and low speed of said driving means and program-control means respectively.

2. A program-timing device according to claim 1, comprising a number of said program elements fixed on said program-controlling means, each of said elements controlling a different standard program and means for rendering one single of such program elements operative for determining all periods of normal speed, high speed and low speed of the program-controlling means.

3. A program-timing device according to claim 1, comprising a set of program elements and means for selectively attaching one of said program elements to the program-controlling means.

4. A program-timing device according to claim 1, having a cam shaft carrying cam discs, the said program elements being cam discs fixed on said program-controlling means, said cam discs each having cam surfaces at three levels, the said program-controlling means being advanced at said normal, high or low speed according to which one of said program elements and its cam surfaces is operative.

5. A program-timing device according to claim 1, having a cam shaft carrying cam discs, the said program elements being cam discs selectively attachable to said program-controlling means, such cam discs having cam surfaces at three levels, the said program-controlling means being advanced at said normal, high or low speed according to which one of said cam surfaces is operative.

6. A program-timing device having a program-controlling member, advancing means for said program-controlling member, a pulse generator for producing pulses at different frequencies, circuit means for transmitting said pulses to said advancing means for stepwise advance of said program-controlling members, said pulse generator having a cam disc for cyclic operation of a number of pulse contacts located around the circumference of the cam disc, and means for selectively connecting at least one of said pulse contacts into said circuit means for producing a pulse frequency corresponding to the number of contacts connected to said circuit means.

7. A program-timing device according to claim 6, comprising two pulse contacts located at diametrically opposite places of said cam disc, said means for selectively connecting pulse contacts includes means for connecting both of said contacts to said circuit means when it is desired to advance the program-controlling member at normal speed and means for connecting one of said contacts to said circuit means when it is desired to advance the program-controlling member at low speed.

8. A program-timing device according to claim 7, wherein said program controlling member is operably associated with a change-over switch having an open intermediate position and two closed positions, one of said pulse contacts being continuously connected into said circuit means and the other pulse contact being connected into said circuit means when the said change-over switch is in one of said closed positions.

9. A program-timing device according to claim 8, comprising a stepping motor executing one full rotation upon receipt of a pulse from said pulse generator, the said program-controlling member being advanced by one step by each full rotation of said stepping motor, the said stepping motor being continuously energized when the said change-over switch is in its other closed position.

10. A program-timing device according to claim 6, comprising means for individually connecting each of said pulse contacts to said circuit means for controlling low speed of the program-controlling member.

References Cited by the Examiner
UNITED STATES PATENTS
3,011,079   11/61   Mellinger _____ 307—141.4

LLOYD McCOLLUM, *Primary Examiner.*